2,979,405

LIGHT-SENSITIVE PHOTOGRAPHIC ELEMENT CONTAINING A 1-HYDROXY-2-NAPHTHOIC ACID ANILIDE COLOR COUPLER

Arthur Henri De Cat, Mortsel-Antwerp, and Bernard Hippoliet Tavernier, Antwerp, Belgium, assignors to Gevaert Photo-Producten N.V.

No Drawing. Filed June 19, 1957, Ser. No. 666,746

Claims priority, application Belgium June 22, 1956

8 Claims. (Cl. 96—55)

The present invention relates to a process for the production of colored photographic images by color development in the presence of a color coupler, to photographic material containing such color coupler and to photographic images obtained according to this process.

It is known that a colored photographic image can be obtained by developing a reducible silver salt image in the presence of a color coupler i.e. a compound which during development couples with the oxidation product of the developer and forms a dyestuff in the immediate vicinity of the developed silver grains.

Different demands are made upon the color couplers according to whether they are designed for negative or for positive material. Among the color couplers known hitherto, which yield cyan dyestuffs the absorption of which is suited for negative material, few transmit sufficiently the green light.

It is an object of the present invention to provide novel color couplers which yield dyestuffs with a favorable absorption curve for use in a negative material and with a good transmission for green light.

It is another object of the present invention to provide novel color couplers which yield dyestuffs with the aforesaid characteristics and which moreover allow the emulsion which contains such color coupler to be coated in an easier way than an emulsion containing another color coupler with a good transmission in the green light.

Further objects will appear from the following description of the invention.

These objects are accomplished by developing an image consisting of reducible silver salt with an amino aromatic developing substance in the presence of a 1-hydroxy-2-naphthoic acid anilide derivative substituted upon the anilide group, in o- or p-position in respect of the amide function by an alkoxy group, which renders the color coupler fast to diffusion and by an acid group in o- or p-position in respect of this alkoxy group.

The preparation of these color couplers can be carried out according to the usual chemical methods of synthesis:

Example 1

1-hydroxy-2-naphthoic acid chloride prepared from 3.8 g. 1-hydroxy-2-naphthoic acid and 3.2 g. thionyl chloride in benzene medium is condensed in 20 cm.³ dioxane with 8 g. 1-amino-2-cetoxy-benzene-5-sulphonic acid in the presence of 1 g. pyridine. (This aminocetoxybenzene sulphonic acid is obtained according to the method described in U.S. Patent 2,629,658.) After refluxing for 1 hour the condensation product is poured into a saturated sodium chloride solution, separated by filtration and washed with a saturated sodium chloride solution. The precipitate obtained is boiled with acetone. A product corresponding to the formula

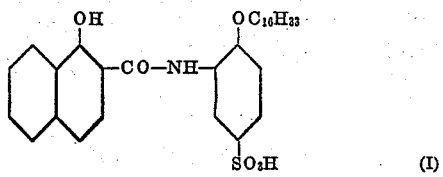

is obtained.

Example 2

10 g. of the product of Formula I is sulphonated by introducing it into 100 cm.³ sulphuric acid 98% at 70° C. After 20 minutes the reaction mixture is poured into 500 cm.³ saturated sodium chloride solution. The precipitate is separated by filtration and washed with saturated sodium chloride solution and alcohol. A product corresponding to the formula:

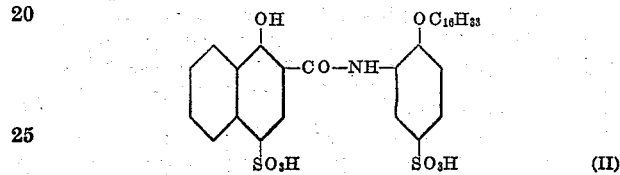

is obtained.

Example 3

3.77 g. 3-amino-4-cetoxybenzoic acid with 2.9 g. 1-hydroxy-2-naphthoic acid phenyl ester are melted in vacuum whilst continuously separating the liberated phenol. The reaction mixture is poured into methanol. The precipitate is recrystallized from acetone. A product melting at 146–148° C. and corresponding to the formula

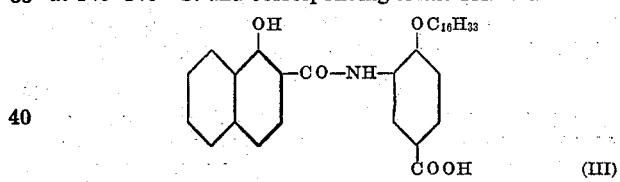

is obtained.

Example 4

2.5 g. of the product corresponding to Formula III are sulphonated by dissolving it in 5 cm.³ concentrated sulphuric acid at 30–35° C. After 1 hour, the mixture is poured into an excess of saturated sodium chloride solution. The separated product is sucked off and washed with acetone. It corresponds to the formula

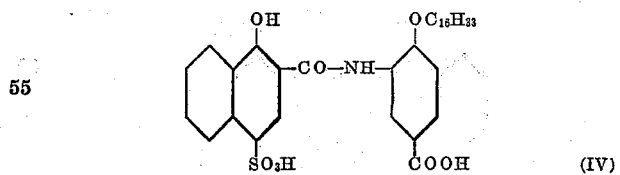

Example 5

(a) 52.8 g. 1-hydroxy-2-naphthoic acid phenyl ester are suspended in 200 cm.³ acetic acid and whilst stirring 33 g. bromine are added, which likewise are dissolved in 75 cm.³ acetic acid. The product slowly dissolves and afterwards a precipitate is again formed. The reaction mixture is poured onto ice and the precipitate is recrystallized from a mixture of dioxane and methanol. 54 g. 1-hydroxy-4-bromo-2-naphthoic acid phenyl ester melting at 106–108° C. are obtained.

(b) 5.6 g. of this ester are melted together with 5.6 g. o-cetoxy-aniline for 1½ hour at 130° C. in vacuum. The liberated phenol is hereby distilled off. The reaction mixture is poured into 35 cm.³ methanol and recrystallized from acetone. 1-hydroxy-4-bromo-2-naphthoic acid-o-cetoxy anilide melting at 70-72° C. is obtained.

(c) 10 g. of this anilide are sulphonated for 30 minutes in 40 cm.³ concentrated sulphuric acid at 30-35° C. The reaction mixture is poured into an excess of saturated sodium chloride solution. The resulting product is sucked off and washed with acetone. It corresponds to the formula

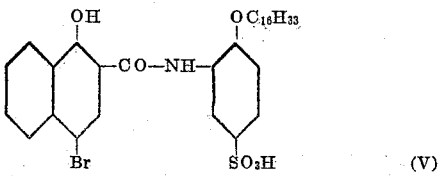

(V)

Melting point: Above 250° C.

The presence of color couplers according to the present invention during color development can result from the addition to the photographic material of a compound, which only differs from the color coupler in that the hydrogen atom in 4-position of the naphthol ring is replaced by a group which splits off before color development under the influence of the alkali in the developer or during color development. Such group can be a chromophorous group which allows masked images to be obtained automatically.

The color coupler according to this invention can be added to a colloid layer, either to a light-sensitive silver halide emulsion layer or to a non-light-sensitive emulsion layer, adjacent to a light-sensitive layer or separated therefrom by a water-permeable colloid layer.

The amino aromatic compounds which according to the invention may be used as developing substance, comprise mono-, di-, and triaminoaryl compounds particularly N,N-dialkyl-p-phenylenediamine and derivatives, such as N,N-dialkyl-N'-sulphomethyl- or carboxymethyl-p-phenylenediamines; as mono-amino developers, aminophenols and aminocresols and their halogen derivatives and likewise aminonaphthols can be considered.

*Example 6*

A solution of the product according to Example 1 is added to a silver bromide emulsion which is then coated on a photographic support. The material thus obtained is exposed and developed in a color developer of usual composition and further treated according to a method customary in color development. In this way an intensely cyan image is obtained which is distinguished by a good transmission of the green light.

We claim:

1. Light-sensitive photographic element comprising a silver halide emulsion layer and the compound of the following formula

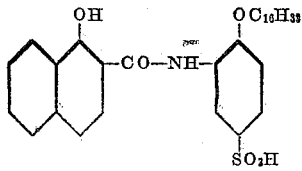

2. Light-sensitive photographic element comprising a silver halide emulsion layer and the compound of the following formula

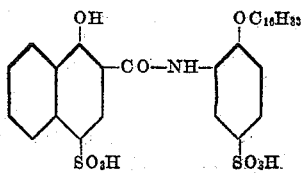

3. Light-sensitive photographic element comprising a silver halide emulsion layer and the compound of the following formula

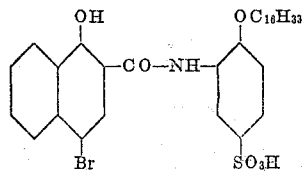

4. Process for obtaining a colored photographic image in a reducible silver halide emulsion layer, comprising exposing said layer, and developing same with a primary aromatic amino developing agent in the presence of a 1-hydroxy-2-naphthoic acid anilide color coupler wherein the phenyl nucleus of the anilide group is substituted in the ortho-position with a cetyloxy group, and in the p-position, with respect to the cetyloxy group, with a sulphonic acid group.

5. Process for obtaining a colored photographic image in a reducible silver halide emulsion layer, comprising exposing said layer, and developing same with a primary aromatic amino developing agent in the presence of the 1-hydroxy-2-naphthoic acid anilide color coupler of the following formula:

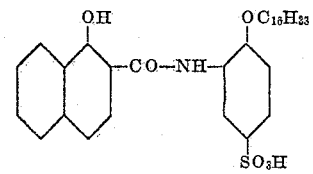

6. Process for obtaining a colored photographic image in a reducible silver halide emulsion layer, comprising exposing said layer, and developing same with a primary aromatic amino developing agent in the presence of the 1-hydroxy-2-naphthoic acid anilide color coupler of the following formula:

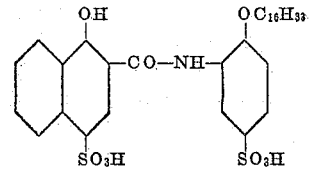

7. Process for obtaining a colored photographic image in a reducible silver halide emulsion layer, comprising exposing said layer, and developing same with a primary aromatic amino developing agent in the presence of the 1-hydroxy-2-naphthoic acid anilide color coupler of the following formula:

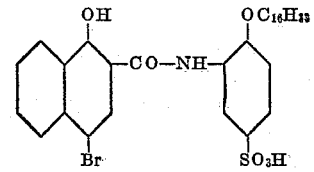

8. Light-sensitive element comprising a silver halide emulsion layer and a 1-hydroxy-2-naphthoic acid anilide color coupler wherein the phenyl nucleus of the anilide group is substituted in the o-position with a cetyloxy group, and in the p-position with respect to the cetyloxy group, with a sulphonic acid group.

References Cited in the file of this patent

UNITED STATES PATENTS

| | | |
|---|---|---|
| 2,166,181 | Salzberg et al. | July 18, 1939 |
| 2,706,684 | Graham et al. | Apr. 19, 1955 |
| 2,712,995 | Weyde | July 12, 1955 |
| 2,772,163 | Tong | Nov. 27, 1956 |